United States Patent
Kamata (10) Patent No.: US 9,054,548 B2
(45) Date of Patent: Jun. 9, 2015

(54) CONTACTLESS POWER FEEDING SYSTEM

(75) Inventor: Koichiro Kamata, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 436 days.

(21) Appl. No.: 13/606,303

(22) Filed: Sep. 7, 2012

(65) Prior Publication Data

US 2013/0069585 A1 Mar. 21, 2013

(30) Foreign Application Priority Data

Sep. 16, 2011 (JP) ................................. 2011-203373

(51) Int. Cl.
*H02J 7/00* (2006.01)
*H02J 5/00* (2006.01)

(52) U.S. Cl.
CPC . *H02J 5/005* (2013.01); *Y02B 60/50* (2013.01)

(58) Field of Classification Search
USPC ......... 320/139, 140, 141, 145, 108, 130, 128, 320/133
See application file for complete search history.

(56) References Cited

U.S. PATENT DOCUMENTS

| | | | |
|---|---|---|---|
| 3,879,647 A * | 4/1975 | Hamilton et al. ............... | 363/16 |
| 5,124,699 A | 6/1992 | Tervoert et al. | |
| 5,126,585 A * | 6/1992 | Boys .............................. | 307/66 |
| 5,428,521 A | 6/1995 | Kigawa et al. | |
| 5,790,946 A | 8/1998 | Rotzoll | |
| 5,998,968 A * | 12/1999 | Pittman et al. ................ | 320/130 |
| 6,025,695 A * | 2/2000 | Friel et al. ..................... | 320/106 |
| 6,184,660 B1 * | 2/2001 | Hatular ......................... | 320/141 |
| 6,509,217 B1 | 1/2003 | Reddy | |
| 6,737,302 B2 | 5/2004 | Arao | |
| 6,837,438 B1 | 1/2005 | Takasugi et al. | |
| 7,180,421 B2 | 2/2007 | Pahlaven et al. | |
| 7,209,771 B2 | 4/2007 | Twitchell, Jr. | |

(Continued)

FOREIGN PATENT DOCUMENTS

| | | |
|---|---|---|
| EP | 2017940 A | 1/2009 |
| EP | 2 372 870 A1 | 10/2011 |

(Continued)

OTHER PUBLICATIONS

Written Opinion for PCT/JP2011/077109 dated Feb. 21, 2012.

(Continued)

*Primary Examiner* — Brian Ngo
(74) *Attorney, Agent, or Firm* — Nixon Peabody LLP; Jeffrey L. Costellia (57) ABSTRACT

The contactless power feeding system includes a power transmitting device including an AC power source, a power transmitting element transmitting an AC power and a first microprocessor generating a transmission signal, and a power receiving device including a power receiving element receiving the AC power, a rectifier circuit, a smoothing circuit, a voltage conversion circuit, a second microprocessor generating a response signal in accordance with the transmission signal, a charge control circuit changing a charging rate for a power storage device in accordance with the response signal and the power storage device whose charging is controlled by the charge control circuit. Then, a resistance value of the power storage device changes, an impedance changes, and a modulation signal is generated. The generated modulation signal is transmitted from the power receiving device to the power transmitting device and is processed by the first microprocessor.

18 Claims, 4 Drawing Sheets

(56) References Cited

U.S. PATENT DOCUMENTS

| | | |
|---|---|---|
| 7,301,830 B2 | 11/2007 | Takahashi et al. |
| 7,394,382 B2 | 7/2008 | Nitzan et al. |
| 8,188,854 B2 | 5/2012 | Yamashita |
| 8,344,688 B2 | 1/2013 | Yoda et al. |
| 8,836,273 B2 | 9/2014 | Yoda et al. |
| 2002/0049714 A1 | 4/2002 | Yamazaki et al. |
| 2003/0017804 A1 | 1/2003 | Heinrich et al. |
| 2003/0104848 A1 | 6/2003 | Brideglall |
| 2004/0077383 A1 | 4/2004 | Lappetelainen et al. |
| 2004/0128246 A1 | 7/2004 | Takayama et al. |
| 2004/0131897 A1 | 7/2004 | Jenson et al. |
| 2004/0145454 A1 | 7/2004 | Powell et al. |
| 2005/0020321 A1 | 1/2005 | Rotzoll |
| 2005/0215119 A1 | 9/2005 | Kaneko |
| 2005/0254183 A1 | 11/2005 | Ishida et al. |
| 2006/0009251 A1 | 1/2006 | Noda et al. |
| 2007/0188135 A1* | 8/2007 | Odaohhara .................. 320/114 |
| 2007/0216348 A1 | 9/2007 | Shionoiri et al. |
| 2007/0229228 A1 | 10/2007 | Yamazaki et al. |
| 2007/0229271 A1 | 10/2007 | Shionoiri et al. |
| 2007/0229279 A1 | 10/2007 | Yamazaki et al. |
| 2007/0229281 A1 | 10/2007 | Shionoiri et al. |
| 2007/0278998 A1 | 12/2007 | Koyama |
| 2007/0285246 A1 | 12/2007 | Koyama |
| 2009/0195165 A1* | 8/2009 | Yang .................. 315/152 |
| 2010/0244577 A1 | 9/2010 | Shimokawa |
| 2010/0244580 A1 | 9/2010 | Uchida et al. |
| 2010/0259109 A1 | 10/2010 | Sato |
| 2010/0289449 A1 | 11/2010 | Elo |
| 2011/0080053 A1 | 4/2011 | Urano |
| 2011/0095619 A1 | 4/2011 | Urano |
| 2011/0101791 A1 | 5/2011 | Urano |
| 2011/0227421 A1 | 9/2011 | Sakoda et al. |
| 2011/0270462 A1 | 11/2011 | Amano et al. |
| 2012/0032521 A1 | 2/2012 | Inoue et al. |
| 2012/0133212 A1 | 5/2012 | Kamata |
| 2013/0082648 A1* | 4/2013 | Kamata .................. 320/108 |
| 2014/0368165 A1 | 12/2014 | Yoda et al. |

FOREIGN PATENT DOCUMENTS

| | | |
|---|---|---|
| EP | 2 421 121 A1 | 2/2012 |
| JP | 2002-101578 | 4/2002 |
| JP | 2006-180073 | 7/2006 |
| JP | 2010-016985 A | 1/2010 |
| JP | 2010-119246 | 5/2010 |
| JP | 2010-130878 | 6/2010 |
| JP | 2010-178473 A | 8/2010 |
| JP | 2010-193598 | 9/2010 |
| JP | 2010-239690 | 10/2010 |
| JP | 2010-239769 | 10/2010 |
| JP | 2010-252446 | 11/2010 |
| JP | 2010-252468 | 11/2010 |
| JP | 2010-284058 A | 12/2010 |
| JP | 2011-155836 A | 8/2011 |
| JP | 2012-060730 | 3/2012 |
| JP | 2012-060731 | 3/2012 |
| WO | WO 2010-055381 A1 | 5/2010 |
| WO | WO 2010-064584 A1 | 6/2010 |
| WO | WO 2010-119577 A1 | 10/2010 |
| WO | WO 2012-070634 A1 | 5/2012 |

OTHER PUBLICATIONS

Kurs et al., "Wireless Power Transfer Via Strongly Coupled Magnetic Resonances", Science, Jul. 6, 2007, vol. 317, No. 5867, pp. 83-86.

Miyamoto et al., "Wireless Power Transfer System With a Simple Receiver Coil", IMWS 2011, (2011 IEEE MTT-S International Microwave Workshop Series), May 12, 2011, pp. 131-134.

International Search Report for PCT/JP2011/077109 dated Feb. 21, 2012.

Written Opinion for PCT/JP2011/077109 dated Feb. 7, 2012.

Karalis. A et al. "Efficient wireless *non-radiative mid-range* energy transfer", Annals of Physics, vol. 323, pp. 34-48, Apr. 27, 2007.

* cited by examiner

CONTACTLESS POWER FEEDING SYSTEM

BACKGROUND OF THE INVENTION

1. Field of the Invention

One embodiment of the invention disclosed herein relates to a contactless power feeding system.

2. Description of the Related Art

Various electronic devices have spread and a wide variety of products are shipped to the market. In recent years, portable electronic devices such as mobile phones and digital video cameras have widely spread. Further, electric propulsion vehicles that are powered by electric power, such as electric cars, are appearing on the market as products.

In such mobile phones, digital video cameras or electric propulsion vehicles, power storage devices serving as power storage means (referred to as batteries and storage batteries) are incorporated. Currently, such a power storage device is charged in most cases by being directly connected to a household AC power source which is a power feeding means. In addition, a unit without a power storage device or a unit which does not use electric power charged in a power storage device is directly supplied with power from a household AC power source through a wiring or the like so that the unit operates.

On the other hand, methods by which power storage devices are charged without making contact or power is supplied to loads without making contact have been researched and developed. Typical methods are an electromagnetic coupling method (also referred to as electromagnetic induction method, see Reference 1), a radio wave method (also referred to as microwave method), and a resonance method (also referred to as resonant method, see References 2 to 4).

As described in References 2 to 4, in a contactless power feeding technique using a resonance method, a device that receives power (hereinafter, referred to as power receiving device) and a device that feeds power (hereinafter, referred to as power transmitting device) each have a resonant coil. Further, in each of the power receiving device and the power transmitting device, an electromagnetic coupling coil is provided. Feeding power from a power source to the resonant coil in the power transmitting device and feeding power from the resonant coil to a load in the power receiving device are conducted by the electromagnetic coupling coils.

The resonant coil of the power transmitting device and the resonant coil of the power receiving device are adjusted to resonate (LC resonance) at the same frequency.

When the resonant coil of the power transmitting device and the resonant coil of the power receiving device face each other, they makes a resonant (resonance) phenomenon, and thereby efficient power transfer is realized even when the distance between the resonant coils are large (see Reference 6).

In recent years, identification technologies in which ID (identification number) is assigned to an individual object to clarify the history of information thereof, which is utilized for production, management, or the like have attracted attention. In particular, RFID (radio frequency identification) technology for transmitting and receiving data by wireless communication has been widely used (see Reference 5). A wireless communication system using RFID technology is a communication system including a wireless communication device (interrogator) and a data carrier (transponder), and data is wirelessly communicated between them. The wireless communication device refers to a device capable of wirelessly transmitting and receiving signals, such as a reader/writer, a mobile phone, or a personal computer. In this specification, the wireless communication device is typically referred to as a reader/writer. In addition, the data carrier is generally called an RFID, an RF tag, an ID tag, an IC tag, an IC chip, a wireless tag, an electronic tag, or the like. In this specification, the data carrier is typically referred to as an RFID.

Examples of RFIDs include passive RFIDs which do not have power sources and active RFIDs which incorporate power sources. The passive RFID has a function of converting a wireless signal (carrier wave or amplitude-modulated wave generated by superimposing modulation wave on carrier wave) transmitted from a reader/writer into a DC voltage by a rectifier circuit which is provided in the RFID, and circuits in the RFID operate using the DC voltage.

REFERENCES

[Reference 1] Japanese Published Patent Application No. 2002-101578
[Reference 2] Japanese Published Patent Application No. 2010-193598
[Reference 3] Japanese Published Patent Application No. 2010-239690
[Reference 4] Japanese Published Patent Application No. 2010-252468
[Reference 5] Japanese Published Patent Application No. 2006-180073
[Reference 6] "Wireless power feeding 2010, all about contactless charging and wireless power transfer", *Nikkei Electronics*, March 2010, pp. 66-81.

SUMMARY OF THE INVENTION

In the above contactless power feeding system using a resonance method, there has been a problem such that only when the distance between the resonant coil of the power transmitting device and the resonant coil of the power receiving device is appropriate, the maximum efficiency can be obtained. Needless to say, when the distance between the two resonant coils is too long, the transmission efficiency is decreased. Even when the distance is too short, the transmission efficiency is also decreased.

Therefore, in addition to the system to feed power, the contactless power feeding system preferably has a communication function using a wireless signal in both the power transmitting device and the power receiving device, and uses the communication function to detect the distance between the two resonant coils, the transmission efficiency of the contactless power feeding system, and the like.

Further, the contactless power feeding system including a wireless communication function can have a simpler circuit configuration; thus, space-saving and cost reduction are achieved.

Figure 2:
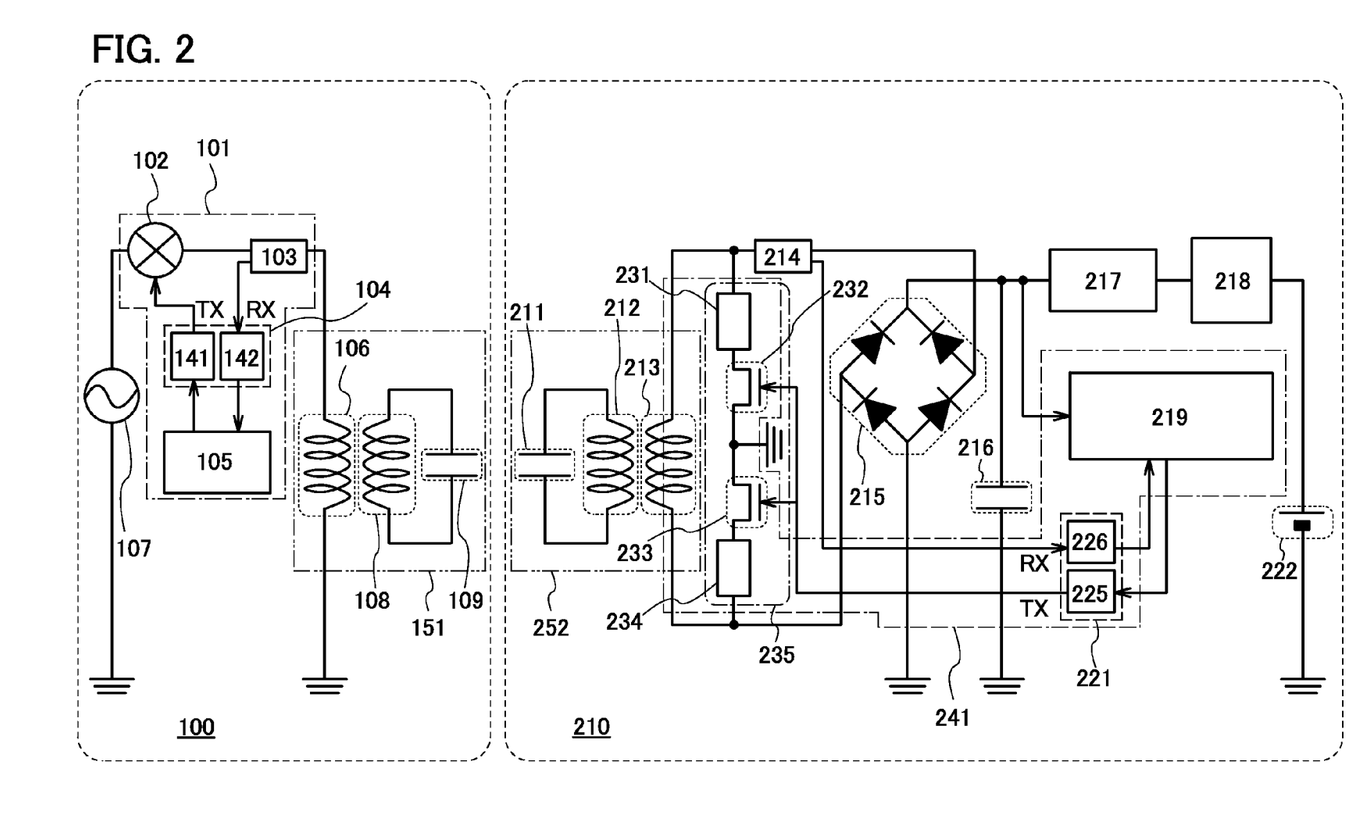
FIG. 2 is a circuit diagram of a contactless power feeding system using a resonance method and including a wireless communication function.

FIG. 2 is a circuit diagram of a contactless power feeding system using a resonance method and including a wireless communication function. The contactless power feeding system illustrated in FIG. 2 includes a power transmitting device 100 and a power receiving device 210.

The contactless power feeding system illustrated in FIG. 2 uses a wireless communication system using RFID technology. Specifically, in the contactless power feeding system illustrated in FIG. 2, a circuit 101 functioning as a reader/writer is used as the power transmitting device 100, and a circuit 241 functioning as an RFID is used as the power receiving device 210. In the contactless power feeding system illustrated in FIG. 2, an electromagnetic wave generated in the power transmitting device 100 is amplitude-modulated and with the use of the amplitude-modulated electromagnetic wave (modulation signal) wireless communication is performed between the power transmitting device 100 and the power receiving device 210.

The power transmitting device 100 includes an AC power source 107, a mixer 102, a directional coupler 103, a transmission/reception circuit 104, a microprocessor 105, an electromagnetic coupling coil 106, a resonant coil 108, and a capacitor 109. The circuit 101 functioning as a reader/writer includes the mixer 102, the directional coupler 103, the transmission/reception circuit 104 including a modulation circuit 141 and a demodulation circuit 142, and the microprocessor 105.

The power receiving device 210 includes a capacitor 211, a resonant coil 212, an electromagnetic coupling coil 213, a load 231, a transistor 232, a transistor 233, a load 234, a directional coupler 214, a rectifier circuit 215, a capacitor 216, a DC-DC converter 217, a charge control circuit 218, a microprocessor 219, a transmission/reception circuit 221 including a modulation circuit 225 and a demodulation circuit 226, and a power storage device 222. Note that the load 231, the transistor 232, the transistor 233, and the load 234 form a load modulation circuit 235. The circuit 241 functioning as the RFID includes the load modulation circuit 235, the microprocessor 219, and the transmission/reception circuit 221.

The AC power source 107 is a power source that outputs a high frequency power. One terminal of the AC power source 107 is electrically connected to a first terminal of the mixer 102. The other terminal of the AC power source 107 is grounded.

The mixer 102 is a circuit having a function of changing the frequency of an AC high frequency power (AC signal) generated in the AC power source 107. The first terminal of the mixer 102 is electrically connected to the one terminal of the AC power source 107. A second terminal of the mixer 102 is electrically connected to a first terminal of the directional coupler 103. A third terminal of the mixer 102 is electrically connected to a first terminal of the modulation circuit 141. Note that the mixer 102 is not necessarily provided unless needed.

The directional coupler 103 and the directional coupler 214 (also referred to as coupler) can take out signals corresponding to electric power transferred in a forward direction (traveling wave), or electric power transferred in the reverse direction (reflected wave), or the both thereof. The first terminal of the directional coupler 103 is electrically connected to the second terminal of the mixer 102. A second terminal of the directional coupler 103 is electrically connected to one terminal of the electromagnetic coupling coil 106. A third terminal of the directional coupler 103 is electrically connected to a first terminal of the demodulation circuit 142.

The modulation circuit 141 included in the transmission/reception circuit 104 has a function of converting a transmission signal output from the microprocessor 105 into a signal which can be processed by the mixer 102. Here, the first terminal of the modulation circuit 141 electrically connected to the third terminal of the mixer 102 is referred to as a terminal TX in some cases. A signal output from the terminal TX of the modulation circuit 141 and then input to the third terminal of the mixer 102 is referred to as a signal TX in some cases.

The first terminal (terminal TX) of the modulation circuit 141 is electrically connected to the third terminal of the mixer 102. A second terminal of the modulation circuit 141 is electrically connected to a first terminal of the microprocessor 105.

The demodulation circuit 142 has a function of converting a wireless signal (refereed to as response signal in this specification) from the power receiving device 210 into a signal which can be processed by the microprocessor 105. Here, the first terminal of the demodulation circuit 142 electrically connected to the third terminal of the directional coupler 103 is referred to as a terminal RX in some cases. A signal output from the third terminal of the directional coupler 103 and then input to the terminal RX of the demodulation circuit 142 is referred to as a signal RX in some cases.

The first terminal (terminal RX) of the demodulation circuit 142 is electrically connected to the third terminal of the directional coupler 103. A second terminal of the demodulation circuit 142 is electrically connected to a second terminal of the microprocessor 105.

The microprocessor 105 has functions of determining a value of the AC signal (AC high frequency power) transmitted from the power transmitting device 100, generating a transmission signal transmitted to the power receiving device 210, and processing a response signal returned from the power receiving device 210 in response to the transmission signal and containing data of the power receiving device 210. The first terminal of the microprocessor 105 is electrically connected to the second terminal of the modulation circuit 141. The second terminal of the microprocessor 105 is electrically connected to the second terminal of the demodulation circuit 142.

The one terminal of the electromagnetic coupling coil 106 is electrically connected to the second terminal of the directional coupler 103. The other terminal of the electromagnetic coupling coil 106 is grounded.

One terminal of the resonant coil 108 is electrically connected to one terminal of the capacitor 109. The other terminal of the resonant coil 108 is electrically connected to the other terminal of the capacitor 109.

Feeding power from the AC power source 107 to the resonant coil 108 is conducted via the electromagnetic coupling coil 106 by an electromagnetic coupling method.

The electromagnetic coupling coil 106 of the power transmitting device 100 and the electromagnetic coupling coil 213 of the power receiving device 210 are each, for example, a coil of about one turn, while the resonant coil 108 of the power transmitting device 100 and the resonant coil 212 of the power receiving device 210 are each, for example, a coil of several turns.

The resonant coil 108 of the power transmitting device 100 and the resonant coil 212 of the power receiving device 210 described below are each open at the opposite ends. The resonant coil 108 and the resonant coil 212 have capacitors due to stray capacitance (corresponding to the capacitor 109 and the capacitor 211 in FIG. 2). Thus, the resonant coil 108 and the resonant coil 212 are LC resonant circuits. Note that the capacitor is not limited to such a stray capacitance method, and the LC resonant circuits may be obtained in such a way that the opposite ends of each coil are electrically connected to a capacitor.

In a power transfer technique using coils, there is a parameter k×Q (k is a coupling coefficient and Q is a Q value of a resonant coil) as a parameter that represents an index of high power transfer efficiency. The coupling coefficient k is a coupling coefficient that represents a degree of coupling of the resonant coil on the power feeding side and the resonant coil on the power receiving side. Further, the Q value is a value showing sharpness in a resonance peak of a resonant circuit. As the resonant coil 108 and the resonant coil 212, resonant coils having extremely high Q values (for example, Q is larger than 100 (k×Q is larger than 1)) are preferably used, and thereby a contactless power feeding technique using a resonance method can provide a high power transfer efficiency.

An AC power generated in the AC power source 107 is transmitted to the power receiving device 210 via the mixer 102, the directional coupler 103, the electromagnetic coupling coil 106, and the resonant coil 108.

In addition, the transmission signal generated in the microprocessor 105 is transmitted to the power receiving device 210 via the terminal TX of the modulation circuit 141, the mixer 102, the directional coupler 103, the electromagnetic coupling coil 106, and the resonant coil 108.

In the power receiving device 210, one terminal of the resonant coil 212 is electrically connected to one terminal of the capacitor 211. The other terminal of the resonant coil 212 is electrically connected to the other terminal of the capacitor 211.

One terminal of the electromagnetic coupling coil 213 is electrically connected to a first terminal of the directional coupler 214. The other terminal of the electromagnetic coupling coil 213 is electrically connected to a first terminal of the rectifier circuit 215 and one terminal of the load 234.

Although, in FIG. 2, the power transmitting device 100 includes the electromagnetic coupling coil 106, the resonant coil 108, and the capacitor 109 (collectively referred to as a power transmitting element 151) and the power receiving device 210 includes the electromagnetic coupling coil 213, the resonant coil 212, and the capacitor 211 (collectively referred to as a power receiving element 252), the structure is not limited to thereto. The power transmitting element 151 and the power receiving element 252 may each be a magnetic field type element including a helical antenna or an electric field type element including a meander line antenna.

The first terminal of the directional coupler 214 is electrically connected to the one terminal of the electromagnetic coupling coil 213 and one terminal of the load 231. A second terminal of the directional coupler 214 is electrically connected to a second terminal of the rectifier circuit 215. A third terminal of the directional coupler 214 is electrically connected to a first terminal of the demodulation circuit 226 in the transmission/reception circuit 221.

The transmission signal transmitted from the power transmitting device 100 is transmitted to the microprocessor 219 via the resonant coil 212, the electromagnetic coupling coil 213, the directional coupler 214, and a terminal RX of the demodulation circuit 226.

The transmission signal transmitted to the microprocessor 219 is processed by the microprocessor 219 and is transmitted as the response signal containing data of the power receiving device 210.

As described above, the load modulation circuit 235 includes the load 231, the transistor 232, the transistor 233, and the load 234.

The one terminal of the load 231 is electrically connected to the one terminal of the electromagnetic coupling coil 213 and the first terminal of the directional coupler 214. The other terminal of the load 231 is electrically connected to one of a source and a drain of the transistor 232.

A gate of the transistor 232 is electrically connected to a first terminal of the modulation circuit 225 in the transmission/reception circuit 221 and a gate of the transistor 233. The one of the source and the drain of the transistor 232 is electrically connected to the other terminal of the load 231. The other of the source and the drain of the transistor 232 is electrically connected to one of a source and a drain of the transistor 233 and is grounded.

The gate of the transistor 233 is electrically connected to the first terminal of the modulation circuit 225 in the transmission/reception circuit 221 and the gate of the transistor 232. The one of the source and the drain of the transistor 233 is electrically connected to the other of the source and the drain of the transistor 232 and is grounded. The other of the source and the drain of the transistor 233 is electrically connected to the other terminal of the load 234.

The one terminal of the load 234 is electrically connected to the other terminal of the electromagnetic coupling coil 213 and the first terminal of the rectifier circuit 215. The other terminal of the load 234 is electrically connected to the other of the source and the drain of the transistor 233.

The above response signal generated in the microprocessor 219 is input to the load modulation circuit 235 via a terminal TX of the modulation circuit 225. Accordingly, the load modulation circuit 235 generates a modulation signal in accordance with the response signal. The generated modulation signal is transmitted to the microprocessor 105 of the power transmitting device 100 via the electromagnetic coupling coil 213 and the resonant coil 212 in the power receiving device 210, the resonant coil 108, the electromagnetic coupling coil 106, the directional coupler 103, and the terminal RX of the demodulation circuit 142 in the power transmitting device 100.

The rectifier circuit 215 is a bridge rectifier including four diodes. The rectifier circuit 215 functions as an AC-DC converter which converts AC power into DC power. The first terminal of the rectifier circuit 215 is electrically connected to the other terminal of the electromagnetic coupling coil 213 and the one terminal of the load 234. The second terminal of the rectifier circuit 215 is electrically connected to the second terminal of the directional coupler 214. A third terminal of the rectifier circuit 215 is electrically connected to one terminal of a capacitor 216, a first terminal of the DC-DC converter 217, and a first terminal of the microprocessor 219. A fourth terminal of the rectifier circuit 215 is grounded.

The capacitor 216 has a function of smoothing DC power output from the rectifier circuit 215 by storing and releasing the DC power. In other words, the capacitor 216 can also be regarded as a smoothing circuit which smoothes DC power. The one terminal of the capacitor 216 is electrically connected to the third terminal of the rectifier circuit 215, the first terminal of the DC-DC converter 217, and the first terminal of the microprocessor 219. The other terminal of the capacitor 216 is grounded.

The DC-DC converter 217 is a voltage conversion circuit converting the voltage value of the DC power into a different voltage value. The first terminal of the DC-DC converter 217 is electrically connected to the one terminal of the capacitor 216, the third terminal of the rectifier circuit 215, and the first terminal of the microprocessor 219. A second terminal of the DC-DC converter 217 is electrically connected to a first terminal of the charge control circuit 218.

The charge control circuit 218 controls charging of the power storage device 222 with the DC power output from the DC-DC converter 217. The first terminal of the charge control circuit 218 is electrically connected to the second terminal of the DC-DC converter 217. A second terminal of the charge control circuit 218 is electrically connected to a positive electrode of the power storage device 222.

The positive electrode of the power storage device 222 is electrically connected to the second terminal of the charge control circuit 218. A negative electrode of the power storage device 222 is grounded.

In the above manner, the AC power transmitted to the power receiving device 210 is transmitted to the rectifier circuit 215 via the resonant coil 212, the electromagnetic coupling coil 213, and the directional coupler 214. The AC power is rectified and converted into the DC power by the rectifier circuit 215. Further, the DC power is smoothed by the capacitor 216 which is the smoothing circuit. The voltage value of the smoothed DC power is converted by the DC-DC converter 217. The DC power whose voltage value has been converted is stored in the power storage device 222 controlled by the charge control circuit 218.

The demodulation circuit 226 in the transmission/reception circuit 221 has a function of converting a high frequency power transmitted from the power transmitting device 100 and received by the power receiving device 210 into a signal which can be processed by the microprocessor 219 when the high frequency power is input to the microprocessor 219 via the directional coupler 214.

The first terminal of the demodulation circuit 226 is electrically connected to the third terminal of the directional coupler 214. A second terminal of the demodulation circuit 226 is electrically connected to a third terminal of the microprocessor 219. Here, the first terminal of the demodulation circuit 226 electrically connected to the third terminal of the directional coupler 214 is referred to as a terminal RX in some cases. A signal output from the third terminal of the directional coupler 214 and then input to the terminal RX of the demodulation circuit 226 is referred to as a signal RX in some cases.

The modulation circuit 225 in the transmission/reception circuit 221 has a function of modulating a signal output from the microprocessor 219. Inputting the modulated signal to the gate of the transistor 232 and the gate of the transistor 233 allows the response signal to be transmitted from the power receiving device 210 to the power transmitting device 100.

The first terminal of the modulation circuit 225 is electrically connected to the gate of the transistor 232 and the gate of the transistor 233. A second terminal of the modulation circuit 225 is electrically connected to a second terminal of the microprocessor 219. Here, the first terminal of the modulation circuit 225 which is electrically connected to the gate of the transistor 232 and the gate of the transistor 233 is referred to as a terminal TX in some cases. A signal output from the terminal TX of the modulation circuit 225 and then input to the gate of the transistor 232 and the gate of the transistor 233 is referred to as a signal TX in some cases.

The microprocessor 219 has functions of processing the AC signal (AC high frequency power) transmitted from the power transmitting device 100, generating the response signal containing data of the power receiving device 210, and detecting the power (voltage and current) input to the DC-DC converter 217.

The first terminal of the microprocessor 219 is electrically connected to the one terminal of the capacitor 216, the third terminal of the rectifier circuit 215, and the first terminal of the DC-DC converter 217. The second terminal of the microprocessor 219 is electrically connected to the second terminal of the modulation circuit 225. The third terminal of the microprocessor 219 is electrically connected to the second terminal of the demodulation circuit 226.

The contactless power feeding system illustrated in FIG. 2 has a disadvantage that the load modulation circuit 235 in the power receiving device 210, which includes the load 231, the transistor 232, the transistor 233, and the load 234, consumes a large amount of power. The transistor 232 and the transistor 233 are repeatedly turned on or off in the load modulation circuit 235, and thereby generates the modulation signal from the received high frequency power. The generated modulation signal is input to the microprocessor 219 via the directional coupler 214 and the demodulation circuit 226. Further, the microprocessor 219 transmits data of the power receiving device 210 as the response signal to the power transmitting device 100 via the load modulation circuit 235.

As described above, during generation of the modulation signal, part of the high frequency power received by the power receiving device 210 from the power transmitting device 100 flows though the load 231, the transistor 232, the transistor 233, and the load 234. High frequency power is a power with high energy. For this reason, the load 231, the transistor 232, the transistor 233, and the load 234 might generate heat. In addition, heat generation might deteriorate, or cause a breakdown of, the load 231, the transistor 232, the transistor 233, and the load 234.

Moreover, even if the transistor 232 and the transistor 233 are not broken, part of the power might be lost due to heat generation every time wireless communication is performed. Such a loss of the power in part every time wireless communication is performed decreases the power transmission efficiency.

In view of the description made above, it is an object of one embodiment of the disclosed invention to provide a contactless power feeding system using a resonance method and having a wireless communication function with high power transmission efficiency.

In one embodiment of the disclosed invention, a response signal output from a microprocessor in a power receiving device and containing data of the power receiving device is input to a charge control circuit controlling a charging rate for a power storage device. The charge control circuit changes the charging rate (current value of charging current flowing into the power storage device) depending on whether the response signal has a high-level potential or a low-level potential. Since the response signal has the high-level potential or the low-level potential, the charging rate for the power storage device also changes digitally. Thus, a resistance value of the power storage device, which is the load resistance changes, and an impedance changes. The change in the impedance generates the modulation signal.

The generated modulation signal is transmitted from the power receiving device to a power transmitting device via an electromagnetic coupling coil and a resonant coil in the power receiving device, and a resonant coil and an electromagnetic coupling coil in the power transmitting device. The modulation signal transmitted to the power transmitting device is input to and is processed by a microprocessor in the power transmitting device.

One embodiment of the disclosed invention relates to a contactless power feeding system including a power transmitting device and a power receiving device. The power transmitting device includes an AC power source configured to generate an AC power; and a power transmitting element configured to transmit the AC power; a first microprocessor between the AC power source and the power transmitting element and configured to generate a transmission signal. The power receiving device includes a power receiving element configured to receive the transmitted AC power; a rectifier circuit configured to convert the AC power received by the power receiving element into a DC power; a smoothing circuit configured to smooth the DC power converted by the rectifier circuit; a voltage conversion circuit configured to convert a voltage value of the smoothed DC power into a different voltage value; a second microprocessor configured to generate a response signal in accordance with the transmission signal; a charge control circuit to which an output power from the voltage conversion circuit and the response signal are input; and a power storage device whose charging is controlled by the charge control circuit. The charge control circuit changes a charging rate for the power storage device in accordance with the response signal. The change in the charging rate for the power storage device changes a resistance value of the power storage device. The change in the resistance value of the power storage device changes an impedance. The change in the impedance generates a modulation signal. The generated modulation signal is transmitted from the power receiving device to the power transmitting device. The transmitted modulation signal is processed by the first microprocessor.

One embodiment of the disclosed invention relates to a contactless power feeding system including a power transmitting device and a power receiving device. The power transmitting device includes an AC power source configured to generate an AC power; a first electromagnetic coupling coil configured to transmit the AC power by electromagnetic coupling; a first microprocessor between the AC power source and the first electromagnetic coupling coil and configured to generate a transmission signal; and a first resonant coil configured to transmit the AC power transmitted from the first electromagnetic coupling coil by electromagnetic resonance. The power receiving device includes a second resonant coil to which the AC power is transmitted from the first resonant coil by electromagnetic resonance; a second electromagnetic coupling coil to which the AC power is transmitted from the second resonant coil by electromagnetic coupling; a rectifier circuit configured to convert the AC power transmitted to the second electromagnetic coupling coil into a DC power; a smoothing circuit configured to smooth the DC power converted by the rectifier circuit; a voltage conversion circuit configured to convert a voltage value of the smoothed DC power into a different voltage value; a second microprocessor configured to generate a response signal in accordance with the transmission signal; a charge control circuit to which an output power from the voltage conversion circuit and the response signal are input; and a power storage device whose charging is controlled by the charge control circuit. The charge control circuit changes a charging rate for the power storage device in accordance with the response signal. The change in the charging rate for the power storage device changes a resistance value of the power storage device. The change in the resistance value of the power storage device changes an impedance. The change in the impedance generates a modulation signal. The generated modulation signal is transmitted from the power receiving device to the power transmitting device. The transmitted modulation signal is processed by the first microprocessor.

In one embodiment of the disclosed invention, the charge control circuit includes a first resistor; a second resistor having a resistance value different from that of the first resistor; and a current mirror circuit.

According to one embodiment of the disclosed invention, a contactless power feeding system using a resonance method and including a wireless communication function with high power transmission efficiency can be provided.

DETAILED DESCRIPTION OF THE INVENTION

Embodiment of the invention disclosed in this specification will be hereinafter described with reference to the accompanying drawings. Note that the invention disclosed in this specification can be carried out in a variety of different modes, and it is easily understood by those skilled in the art that the modes and details of the invention disclosed in this specification can be changed in various ways without departing from the spirit and scope thereof. Therefore, the present invention is not construed as being limited to description of the embodiment. Note that, in the drawings hereinafter shown, the same portions or portions having similar functions are denoted by the same reference numerals, and repeated description thereof will be omitted.

Note that in the invention disclosed in this specification, a semiconductor device refers to an element or a device which functions by utilizing a semiconductor and includes, in its category, an electric device including an electronic circuit, a display device, a light-emitting device, and the like and an electronic appliance on which the electric device is mounted.

Note that the position, size, range, or the like of each structure shown in the drawings and the like is not accurately represented in some cases for easy understanding. Therefore, the disclosed invention is not necessarily limited to the position, size, range, or the like as disclosed in the drawings and the like.

In this specification and the like, ordinal numbers such as "first", "second", and "third" are used in order to avoid confusion among components, and the terms do not mean limitation of the number of components.

Figure 1:
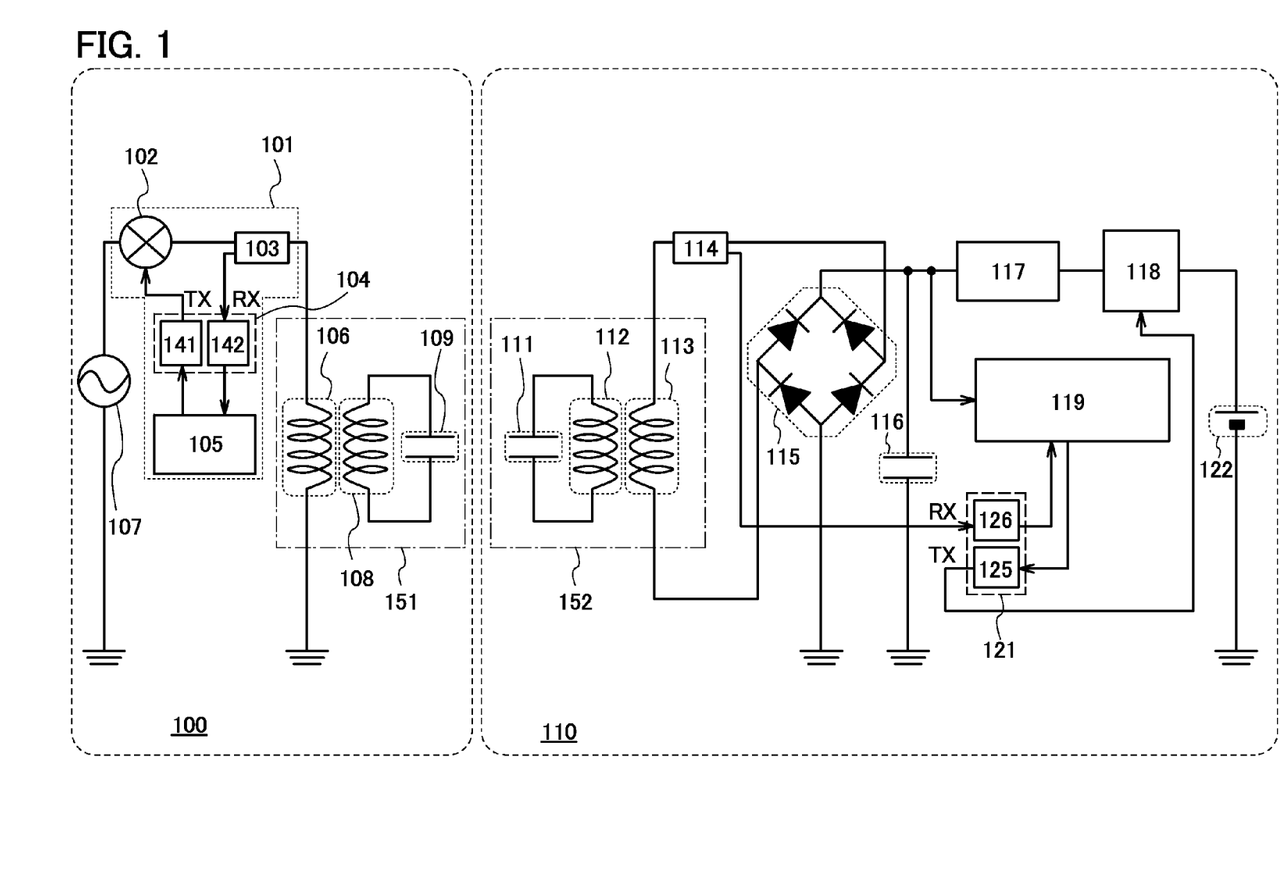
FIG. 1 is a circuit diagram of a contactless power feeding system using a resonance method and including a wireless communication function according to this embodiment.

FIG. 1 is a circuit diagram of a contactless power feeding system using a resonance method and including a wireless communication function according to this embodiment. The contactless power feeding system illustrated in FIG. 1 includes a power transmitting device 100 and a power receiving device 110.

The power transmitting device 100 includes an AC power source 107, a mixer 102, a directional coupler 103, a transmission/reception circuit 104, a microprocessor 105, an electromagnetic coupling coil 106, a resonant coil 108, and a capacitor 109.

The power receiving device 110 includes a capacitor 111, a resonant coil 112, an electromagnetic coupling coil 113, a directional coupler 114, a rectifier circuit 115, a capacitor 116, a DC-DC converter 117, a charge control circuit 118, a microprocessor 119, a transmission/reception circuit 121 including a modulation circuit 125 and a demodulation circuit 126, and a power storage device 122.

The AC power source 107 is a power source that outputs a high frequency power. One terminal of the AC power source 107 is electrically connected to a first terminal of the mixer 102. The other terminal of the AC power source 107 is grounded.

The mixer 102 is a circuit having a function of changing the frequency of an AC high frequency power (AC signal) generated in the AC power source 107. The first terminal of the mixer 102 is electrically connected to the one terminal of the AC power source 107. A second terminal of the mixer 102 is electrically connected to a first terminal of the directional coupler 103. A third terminal of the mixer 102 is electrically connected to a first terminal of the modulation circuit 141. Note that the mixer 102 is not necessarily provided unless needed.

The directional coupler 103 and the directional coupler 114 (also referred to as coupler) can take out signals corresponding to electric power transferred in a forward direction (traveling wave), or electric power transferred in the reverse direction (reflected wave), or the both thereof. The first terminal of the directional coupler 103 is electrically connected to the second terminal of the mixer 102. A second terminal of the directional coupler 103 is electrically connected to one terminal of the electromagnetic coupling coil 106. A third terminal of the directional coupler 103 is electrically connected to a first terminal of the demodulation circuit 142.

The modulation circuit 141 included in the transmission/reception circuit 104 has a function of converting a transmission signal output from the microprocessor 105 into a signal which can be processed by the mixer 102. Here, the first terminal of the modulation circuit 141 electrically connected to the third terminal of the mixer 102 is referred to as a terminal TX in some cases. A signal output from the terminal TX of the modulation circuit 141 and then input to the third terminal of the mixer 102 is referred to as a signal TX in some cases.

The first terminal (terminal TX) of the modulation circuit 141 is electrically connected to the third terminal of the mixer 102. A second terminal of the modulation circuit 141 is electrically connected to a first terminal of the microprocessor 105.

Note that when the mixer 102 is not provided in the power transmitting device 100, the first terminal (terminal TX) of the modulation circuit 141 is electrically connected to the one terminal of the AC power source 107 and the first terminal of the directional coupler 103. As in the above, the second terminal of the modulation circuit 141 is electrically connected to the first terminal of the microprocessor 105.

The demodulation circuit 142 has a function of converting a wireless signal (refereed to as response signal in this specification) from the power receiving device 110 into a signal which can be processed by the microprocessor 105. Here, the first terminal of the demodulation circuit 142 electrically connected to the third terminal of the directional coupler 103 is referred to as a terminal RX in some cases. A signal output from the third terminal of the directional coupler 103 and then input to the terminal RX of the demodulation circuit 142 is referred to as a signal RX in some cases.

The first terminal (terminal RX) of the demodulation circuit 142 is electrically connected to the third terminal of the directional coupler 103. A second terminal of the demodulation circuit 142 is electrically connected to a second terminal of the microprocessor 105.

The microprocessor 105 has functions of determining a value of the AC signal (AC high frequency power) transmitted from the power transmitting device 100, generating a transmission signal transmitted to the power receiving device 110, and processing a response signal returned from the power receiving device 110 in response to the transmission signal and containing data of the power receiving device 110. The first terminal of the microprocessor 105 is electrically connected to the second terminal of the modulation circuit 141. The second terminal of the microprocessor 105 is electrically connected to the second terminal of the demodulation circuit 142.

The one terminal of the electromagnetic coupling coil 106 is electrically connected to the second terminal of the directional coupler 103. The other terminal of the electromagnetic coupling coil 106 is grounded.

One terminal of the resonant coil 108 is electrically connected to one terminal of the capacitor 109. The other terminal of the resonant coil 108 is electrically connected to the other terminal of the capacitor 109.

Feeding power from the AC power source 107 to the resonant coil 108 is conducted via the electromagnetic coupling coil 106 by an electromagnetic coupling method.

The electromagnetic coupling coil 106 of the power transmitting device 100 and the electromagnetic coupling coil 113 of the power receiving device 110 are each, for example, a coil of about one turn, while the resonant coil 108 of the power transmitting device 100 and the resonant coil 112 of the power receiving device 110 are each, for example, a coil of several turns.

The resonant coil 108 of the power transmitting device 100 and the resonant coil 112 of the power receiving device 110 described below are each open at the opposite ends. The resonant coil 108 and the resonant coil 112 have capacitors due to stray capacitance. Thus, the resonant coil 108 and the resonant coil 112 are LC resonant circuits. Note that the capacitor is not limited to such a stray capacitance method, and the LC resonant circuits may be obtained in such a way that the opposite ends of each coil are electrically connected to a capacitor.

In a power transfer technique using coils, there is a parameter $k \times Q$ (k is a coupling coefficient and Q is a Q value of a resonant coil) as a parameter that represents an index of high power transfer efficiency. The coupling coefficient k is a coupling coefficient that represents a degree of coupling of the resonant coil on the power feeding side and the resonant coil on the power receiving side. Further, the Q value is a value showing sharpness in a resonance peak of a resonant circuit. As the resonant coil 108 and the resonant coil 112, resonant coils having extremely high Q values (for example, Q is larger than 100 ($k \times Q$ is larger than 1)) are preferably used, and thereby a contactless power feeding technique using a resonance method can provide a high power transfer efficiency.

An AC power generated in the AC power source 107 is transmitted to the power receiving device 110 via the mixer 102, the directional coupler 103, the electromagnetic coupling coil 106, and the resonant coil 108.

In addition, the transmission signal generated in the microprocessor 105 is transmitted to the power receiving device 110 via the terminal TX of the modulation circuit 141, the mixer 102, the directional coupler 103, the electromagnetic coupling coil 106, and the resonant coil 108.

In the power receiving device 110, one terminal of the resonant coil 112 is electrically connected to one terminal of the capacitor 111. The other terminal of the resonant coil 112 is electrically connected to the other terminal of the capacitor 111.

One terminal of the electromagnetic coupling coil 113 is electrically connected to a first terminal of the directional coupler 114. The other terminal of the electromagnetic coupling coil 113 is electrically connected to a first terminal of the rectifier circuit 115.

Although, in FIG. 1, the power transmitting device 100 includes the electromagnetic coupling coil 106, the resonant coil 108, and the capacitor 109 (collectively referred to as a power transmitting element 151) and the power receiving device 110 includes the electromagnetic coupling coil 113, the resonant coil 112, and the capacitor 111 (collectively referred to as a power receiving element 152), the present invention is not limited to this structure. The power transmitting element 151 and the power receiving element 152 may each be a magnetic field type element including a helical antenna or an electric field type element including a meander line antenna.

The power transmitting element 151 is electrically connected to the AC power source 107 via the directional coupler 103 and the mixer 102 and has a function of transmitting the AC power generated in the AC power source 107. The power receiving element 152 is electrically connected to the directional coupler 114 and the rectifier circuit 115 and has a function of receiving the transmitted AC power.

The first terminal of the directional coupler 114 is electrically connected to the one terminal of the electromagnetic coupling coil 113. A second terminal of the directional coupler 114 is electrically connected to a second terminal of the rectifier circuit 115. A third terminal of the directional coupler 114 is electrically connected to a first terminal of the demodulation circuit 126 in the transmission/reception circuit 121.

The transmission signal transmitted from the power transmitting device 100 is transmitted to the microprocessor 119 via the resonant coil 112, the electromagnetic coupling coil 113, the directional coupler 114, and a terminal RX of the demodulation circuit 126.

The transmission signal transmitted to the microprocessor 119 is processed by the microprocessor 119 and is transmitted as the response signal containing data of the power receiving device 110.

The rectifier circuit 115 is a bridge rectifier including four diodes. The rectifier circuit 115 functions as an AC-DC converter which converts AC power into DC power. The first terminal of the rectifier circuit 115 is electrically connected to the other terminal of the electromagnetic coupling coil 113. The second terminal of the rectifier circuit 115 is electrically connected to the second terminal of the directional coupler 114. A third terminal of the rectifier circuit 115 is electrically connected to one terminal of a capacitor 116, a first terminal of the DC-DC converter 117, and a first terminal of the microprocessor 119. A fourth terminal of the rectifier circuit 115 is grounded.

The capacitor 116 has a function of smoothing DC power output from the rectifier circuit 115 by storing and releasing the DC power. In other words, the capacitor 116 can also be regarded as a smoothing circuit which smoothes DC power. The one terminal of the capacitor 116 is electrically connected to the third terminal of the rectifier circuit 115, the first terminal of the DC-DC converter 117, and the first terminal of the microprocessor 119. The other terminal of the capacitor 116 is grounded.

The DC-DC converter 117 is a voltage conversion circuit converting the voltage value of the DC power into a different voltage value. The first terminal of the DC-DC converter 117 is electrically connected to the one terminal of the capacitor 116, the third terminal of the rectifier circuit 115, and the first terminal of the microprocessor 119. A second terminal of the DC-DC converter 117 is electrically connected to a first terminal of the charge control circuit 118.

The charge control circuit 118 controls charging of the power storage device 122 with the DC power output from the DC-DC converter 117. The first terminal of the charge control circuit 118 is electrically connected to the second terminal of the DC-DC converter 117. A second terminal of the charge control circuit 118 is electrically connected to a positive electrode of the power storage device 122. A third terminal of the charge control circuit 118 is electrically connected to a first terminal of the modulation circuit 125 in the transmission/reception circuit 121. Note that a specific example of a circuit configuration of the charge control circuit 118 will be described later.

The positive electrode of the power storage device 122 is electrically connected to the second terminal of the charge control circuit 118. A negative electrode of the power storage device 122 is grounded.

The AC power transmitted to the power receiving device 110 is transmitted to the rectifier circuit 115 via the resonant coil 112, the electromagnetic coupling coil 113, and the directional coupler 114. The AC power is rectified and converted into the DC power by the rectifier circuit 115. Further, the DC power is smoothed by the capacitor 116 which is the smoothing circuit. The voltage value of the smoothed DC power is converted by the DC-DC converter 117. The DC power whose voltage value has been converted is stored in the power storage device 122 controlled by the charge control circuit 118.

The demodulation circuit 126 in the transmission/reception circuit 121 has a function of converting a high frequency power transmitted from the power transmitting device 100 and received by the power receiving device 110 into a signal which can be processed by the microprocessor 119 when the high frequency power is input to the microprocessor 119 via the directional coupler 114.

The first terminal of the demodulation circuit 126 is electrically connected to the third terminal of the directional coupler 114. A second terminal of the demodulation circuit 126 is electrically connected to a third terminal of the microprocessor 119. Here, the first terminal of the demodulation circuit 126 electrically connected to the third terminal of the directional coupler 114 is referred to as a terminal RX in some cases. A signal output from the third terminal of the directional coupler 114 and then input to the terminal RX of the demodulation circuit 126 is referred to as a signal RX in some cases.

The modulation circuit 125 in the transmission/reception circuit 121 has a function of modulating a signal output from the microprocessor 119.

The first terminal of the modulation circuit 125 is electrically connected to the third terminal of the charge control circuit 118. A second terminal of the modulation circuit 125 is electrically connected to a second terminal of the microprocessor 119. Here, the first terminal of the modulation circuit 125 electrically connected to the third terminal of the charge control circuit 118 is referred to as a terminal TX in some cases. A signal output from the terminal TX of the modulation circuit 125 and then input to the third terminal of the charge control circuit 118 is referred to as a signal TX in some cases.

The microprocessor 119 has functions of processing the AC signal (AC high frequency power) transmitted from the power transmitting device 100, generating the response signal containing data of the power receiving device 110, and detecting the power (voltage and current) input to the DC-DC converter 117.

The first terminal of the microprocessor 119 is electrically connected to the third terminal of the rectifier circuit 115, the one terminal of the capacitor 116, and the first terminal of the DC-DC converter 117. The second terminal of the microprocessor 119 is electrically connected to the second terminal of the modulation circuit 125. The third terminal of the microprocessor 119 is electrically connected to the second terminal of the demodulation circuit 126.

As described above, the microprocessor 119 generates data of the power receiving device 110 as the response signal. The generated response signal is input to the charge control circuit 118 controlling the charging rate for the power storage device 122 via the terminal TX of the modulation circuit 125. The charge control circuit 118 changes a charging rate (current value of charging current flowing into the power storage device 122) depending on whether the response signal has a high-level potential or a low-level potential. Since the response signal has the high-level potential or the low-level potential, the charging rate for the power storage device 122 also changes digitally. Thus, a resistance value of the power storage device 122, which is the load resistance changes, and an impedance changes. The change in the impedance generates the modulation signal. In this manner, the modulation signal is generated in accordance with the response signal.

The generated modulation signal is transmitted to and is processed by the microprocessor 105 of the power transmitting device 100 via the electromagnetic coupling coil 113 and the resonant coil 112 in the power receiving device 110, the resonant coil 108, the electromagnetic coupling coil 106, the directional coupler 103, and the terminal RX of the demodulation circuit 142 in the power transmitting device 100.

Figure 3:
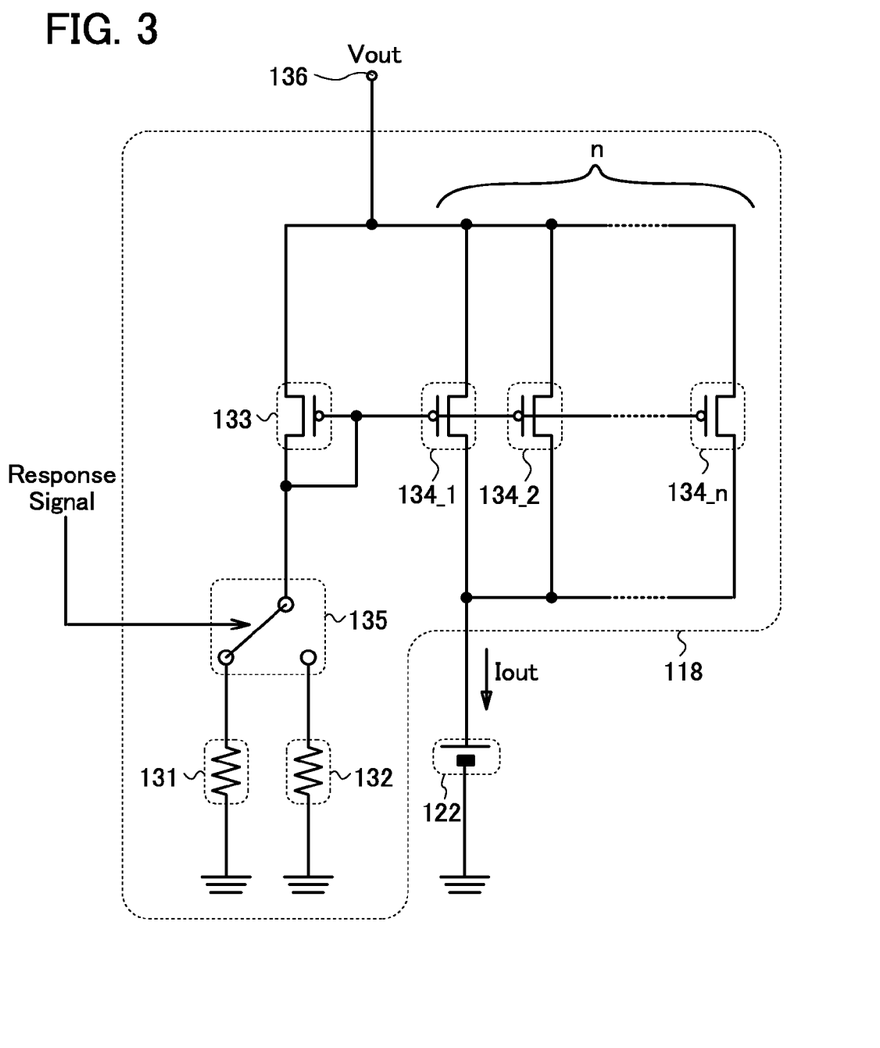
FIG. 3 is a circuit diagram of a charge control circuit.

Here, FIG. 3 illustrates one example of a circuit configuration of the charge control circuit 118.

The charge control circuit 118 illustrated in FIG. 3 includes a resistor 131 having a resistance value R1, a resistor 132 having a resistance value R2, a switch 135, a transistor 133, and transistors 134_1 to 134_n (n is an integer greater than or equal to 1). In the charge control circuit 118 illustrated in FIG. 3, the transistor 133 and the transistors 134_1 to 134_n (n is an integer greater than or equal to 1) form a current mirror circuit.

One terminal of the resistor 131 is electrically connected to one terminal of the switch 135 or is at a floating potential without being electrically connected to the one terminal of the switch 135. The other terminal of the resistor 131 is grounded.

One terminal of the resistor 132 is electrically connected to the one terminal of the switch 135 or is at a floating potential without being electrically connected to the one terminal of the switch 135. The other terminal of the resistor 132 is grounded.

The one terminal of the switch 135 is electrically connected to the one terminal of the resistor 131 or the one terminal of the resistor 132. Whether the one terminal of the switch 135 is electrically connected to the one terminal of the resistor 131 or the one terminal of the resistor 132 depends on the response signal. The other terminal of the switch 135 is electrically connected to one of a source and a drain of the transistor 133, a gate of the transistor 133, and a gate of each of the transistors 134_1 to 134_n.

The gate of the transistor 133 is electrically connected to the one of the source and the drain of the transistor 133, the gate of each of the transistors 134_1 to 134_n, and the other terminal of the switch 135. The one of the source and the drain of the transistor 133 is electrically connected to the gate of the transistor 133, the gate of each of the transistors 134_1 to 134_n, and the other terminal of the switch 135. The other of the source and the drain of the transistor 133 is electrically connected to one of a source and a drain of each of the transistors 134_1 to 134_n and a terminal 136 applying a power supply voltage Vdd.

The gate of each of the transistors 134_1 to 134_n is electrically connected to the gate of the transistor 133, the one of the source and the drain of the transistor 133, and the other terminal of the switch 135. The one of the source and the drain of each of the transistors 134_1 to 134_n is electrically connected to the other of the source and the drain of the transistor 133 and the terminal 136 to which an output voltage $V_{OUT}$ of the DC-DC converter 117 is applied. The other of the source and the drain of each of the transistors 134_1 to 134_n is electrically connected to the positive electrode of the power storage device 122.

In the charge control circuit 118 illustrated in FIG. 3, the potentials of the gates of the transistor 133 and the transistors 134_1 to 134_n, which collectively form the current mirror circuit, are equal to one another. Therefore, the values of the currents flowing between the sources and the drains of the transistor 133 and the transistors 134_1 to 134_n are equal to one another.

As illustrated in FIG. 3, the current value of a charging current $I_{OUT}$ flowing into the power storage device 122 is the sum of the values of the currents flowing between the sources and the drains of the transistors 134_1 to 134_n. Since the values of the currents flowing between the sources and the drains of the transistor 133 and the transistors 134_1 to 134_n are equal to one another, the current value of the charging current $I_{OUT}$ is n times as large as that of the current flowing between the source and the drain of the transistor 133.

The one of the source and the drain of the transistor 133 is electrically connected via the switch 135 to the resistor 131 having a resistance value R1 or the resistor 132 having a resistance value R2. Whether the one of the source and the drain of the transistor 133 is electrically connected to the resistor 131 or the resistor 132 is determined in accordance with the response signal.

As described above, the current value of the charging current $I_{OUT}$ flowing into the power storage device 122 is determined in accordance with the response signal.

Figure 4:
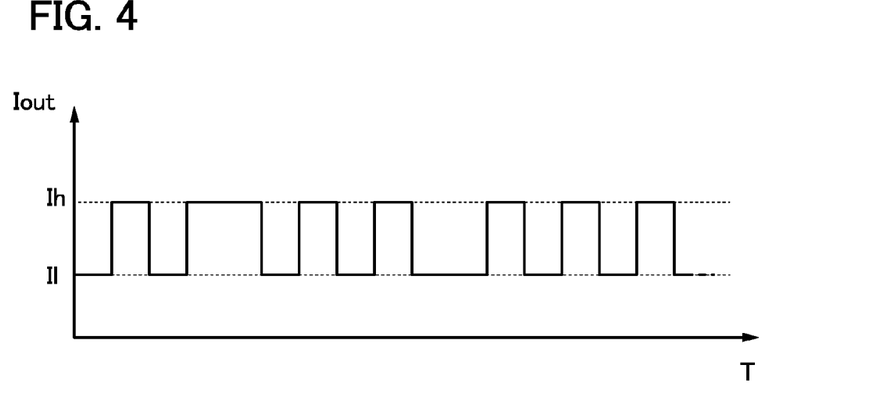
FIG. 4 is a diagram showing changes in charging current.

FIG. 4 shows a relation between time T and charging current $I_{OUT}$ in the case where the circuit illustrated in FIG. 3 is used as the charge control circuit 118. Note that in the case where the resistance value R1 of the resistor 131 in the charge control circuit 118 illustrated in FIG. 3 is smaller than the resistance value R2 of the resistor 132 (R1<R2), when the switch 135 is electrically connected to the resistor 131, the charging current $I_{OUT}$ is large (current value Ih); whereas when the switch 135 is electrically connected to the resistor 132, the charging current $I_{OUT}$ is small (current value Il) (Ih>Il).

As shown in FIG. 4, the charging current $I_{OUT}$ changes digitally to either the charging current Ih or the charging current Il depending on whether the response signal has a high-level potential or a low-level potential.

By changing the charging current $I_{OUT}$ digitally, the resistance value of the power storage device 122, which is the load resistance changes, and an impedance changes. The change in the impedance generates the modulation signal.

Further, even when the charging current $I_{OUT}$ changes digitally, a current charging the power storage device 122 flows continuously. Thus, the power storage device 122 is continuously charged with the DC power. Note that when charging of the power storage device 122 is completed, the generation of the modulation signal is also terminated.

In this embodiment, the charge control circuit 118 changes the charging rate for the power storage device 122 in accordance with the response signal containing data of the power receiving device 110. The change of the charging rate for the power storage device 122 causes a change in the resistance value of the power storage device 122, which is the load resistance, and the impedance changes. The change in the impedance can generate the modulation signal.

Therefore, unlike the contactless power feeding system illustrated in FIG. 2, the contactless power feeding system of this embodiment (see FIG. 1) generates the modulation signal in a part other than a path of the high frequency power received by the power receiving device 110. This can suppress heat generation and also prevent part of electric power from being lost. According to this embodiment, a contactless power feeding system using a resonance method and including a wireless communication function with high power transmission efficiency can be provided.

This application is based on Japanese Patent Application serial no. 2011-203373 filed with Japan Patent Office on Sep. 16, 2011, the entire contents of which are hereby incorporated by reference.

What is claimed is:

1. A contactless power feeding system comprising:
    a power transmitting device, the power transmitting device comprising:
        an AC power source configured to generate an AC power;
        a power transmitting element configured to transmit the AC power; and
        a first microprocessor between the AC power source and the power transmitting element, the first microprocessor configured to generate a transmission signal; and
    a power receiving device, the power receiving device comprising:
        a power receiving element configured to receive the AC power transmitted by the power transmitting element;
        a rectifier circuit configured to convert the AC power received by the power receiving element into a DC power;
        a smoothing circuit configured to smooth the DC power converted by the rectifier circuit;
        a voltage conversion circuit configured to convert a voltage value of the DC power smoothed by the smoothing circuit into a different voltage value;
        a second microprocessor configured to generate a response signal in accordance with the transmission signal;
        a charge control circuit to which an output power from the voltage conversion circuit and the response signal are input; and
        a power storage device whose charging is controlled by the charge control circuit,
    wherein the charge control circuit makes a first change in a charging rate for the power storage device in accordance with the response signal,
    wherein the first change in the charging rate for the power storage device makes a second change in a resistance value of the power storage device,
    wherein the second change in the resistance value of the power storage device makes a third change in an impedance,
    wherein the third change in the impedance generates a modulation signal,
    wherein the modulation signal generated by the third change in the impedance is transmitted from the power receiving device to the power transmitting device, and
    wherein the modulation signal transmitted from the power receiving device to the power transmitting device is processed by the first microprocessor.

2. The contactless power feeding system according to claim 1, wherein the charge control circuit comprises:
    a switch;
    a first resistor having a resistance value R1;
    a second resistor having a resistance value R2; and
    a current mirror circuit comprising a first transistor and a second transistor,
    wherein the resistance value R1 is different from the resistance value R2,
    wherein one terminal of the switch is electrically connected to one terminal of the first resistor,
    wherein one terminal of the second resistor is at a floating potential,
    wherein the other terminal of the switch electrically connected to one of a source and a drain of the first transistor,
    wherein the other terminal of the first resistor is grounded,
    wherein the other terminal of the second resistor is grounded, and
    wherein a gate of the first transistor is electrically connected to one of the source and the drain of the first transistor, a gate of the second transistor, and the one terminal of the switch.

3. The contactless power feeding system according to claim 1,
    wherein the power transmitting element and the power receiving element comprise a magnetic field type element comprising a helical antenna or an electric field type element comprising a meander line antenna.

4. The contactless power feeding system according to claim 1,
    wherein the rectifier circuit comprises a bridge rectifier including four diodes.

5. The contactless power feeding system according to claim 1,
    wherein the smoothing circuit comprises a capacitor, and
    wherein the voltage conversion circuit comprises a DC-DC converter.

6. A contactless power feeding system comprising:
    a power transmitting device, the power transmitting device comprising:
        an AC power source configured to generate an AC power;
        a first electromagnetic coupling coil configured to transmit the AC power by electromagnetic coupling;
        a first microprocessor between the AC power source and the first electromagnetic coupling coil, the first microprocessor configured to generate a transmission signal; and
        a first resonant coil configured to transmit the AC power transmitted from the first electromagnetic coupling coil by electromagnetic resonance; and
    a power receiving device, the power receiving device comprising:
        a second resonant coil to which the AC power is transmitted from the first resonant coil by electromagnetic resonance;
        a second electromagnetic coupling coil to which the AC power is transmitted from the second resonant coil by electromagnetic coupling;
        a rectifier circuit configured to convert the AC power transmitted to the second electromagnetic coupling coil into a DC power;
        a smoothing circuit configured to smooth the DC power converted by the rectifier circuit;
        a voltage conversion circuit configured to convert a voltage value of the DC power smoothed by the smoothing circuit into a different voltage value;
        a second microprocessor configured to generate a response signal in accordance with the transmission signal;
        a charge control circuit to which an output power from the voltage conversion circuit and the response signal are input; and
        a power storage device whose charging is controlled by the charge control circuit,
    wherein the charge control circuit makes a first change in a charging rate for the power storage device in accordance with the response signal,
    wherein the first change in the charging rate for the power storage device makes a second change in a resistance value of the power storage device, wherein the second change in the resistance value of the power storage device makes a third change in an impedance, wherein the third change in the impedance generates a modulation signal, wherein the modulation signal generated by the third change in the impedance is transmitted from the power receiving device to the power transmitting device, and wherein the modulation signal transmitted from the power receiving device to the power transmitting device is processed by the first microprocessor.

7. The contactless power feeding system according to claim 6, wherein the charge control circuit comprises:
   a switch;
   a first resistor having a resistance value R1;
   a second resistor having a resistance value R2; and
   a current mirror circuit comprising a first transistor and a second transistor,
   wherein the resistance value R1 is different from the resistance value R2,
   wherein one terminal of the switch is electrically connected to one terminal of the first resistor,
   wherein one terminal of the second resistor is at a floating potential,
   wherein the other terminal of the switch electrically connected to one of a source and a drain of the first transistor,
   wherein the other terminal of the first resistor is grounded,
   wherein the other terminal of the second resistor is grounded, and
   wherein a gate of the first transistor is electrically connected to one of the source and the drain of the first transistor, a gate of the second transistor, and the one terminal of the switch.

8. The contactless power feeding system according to claim 6,
   wherein the rectifier circuit comprises a bridge rectifier including four diodes.

9. The contactless power feeding system according to claim 6,
   wherein the smoothing circuit comprises a capacitor, and
   wherein the voltage conversion circuit comprises a DC-DC converter.

10. A power receiving device comprising:
    a power receiving element configured to receive an AC power;
    a rectifier circuit configured to convert the AC power received by the power receiving element into a DC power;
    a smoothing circuit configured to smooth the DC power converted by the rectifier circuit;
    a voltage conversion circuit configured to convert a voltage value of the DC power smoothed by the smoothing circuit into a different voltage value;
    a second microprocessor configured to generate a response signal in accordance with a signal;
    a charge control circuit to which an output power from the voltage conversion circuit and the response signal are input; and
    a power storage device whose charging is controlled by the charge control circuit,
    wherein the charge control circuit makes a first change in a charging rate for the power storage device in accordance with the response signal,
    wherein the first change in the charging rate for the power storage device makes a second change in a resistance value of the power storage device, wherein the second change in the resistance value of the power storage device makes a third change in an impedance, wherein the third change in the impedance generates a modulation signal, and wherein the modulation signal generated by the third change in the impedance is transmitted from the power receiving device.

11. The power receiving device according to claim 10, wherein the charge control circuit comprises:
    a switch;
    a first resistor having a resistance value R1;
    a second resistor having a resistance value R2; and
    a current mirror circuit comprising a first transistor and a second transistor,
    wherein the resistance value R1 is different from the resistance value R2,
    wherein one terminal of the switch is electrically connected to one terminal of the first resistor,
    wherein one terminal of the second resistor is at a floating potential,
    wherein the other terminal of the switch electrically connected to one of a source and a drain of the first transistor,
    wherein the other terminal of the first resistor is grounded,
    wherein the other terminal of the second resistor is grounded, and
    wherein a gate of the first transistor is electrically connected to one of the source and the drain of the first transistor, a gate of the second transistor, and the one terminal of the switch.

12. The power receiving device according to claim 10,
    wherein the power receiving element comprise a magnetic field type element comprising a helical antenna or an electric field type element comprising a meander line antenna.

13. The power receiving device according to claim 10,
    wherein the rectifier circuit comprises a bridge rectifier including four diodes.

14. The power receiving device according to claim 10,
    wherein the smoothing circuit comprises a capacitor, and
    wherein the voltage conversion circuit comprises a DC-DC converter.

15. A power receiving device comprising:
    a resonant coil configured to receive an AC power by electromagnetic resonance;
    a electromagnetic coupling coil to which the AC power is transmitted from the resonant coil by electromagnetic coupling;
    a rectifier circuit configured to convert the AC power transmitted to the electromagnetic coupling coil into a DC power;
    a smoothing circuit configured to smooth the DC power converted by the rectifier circuit;
    a voltage conversion circuit configured to convert a voltage value of the DC power smoothed by the smoothing circuit into a different voltage value;
    a microprocessor configured to generate a response signal in accordance with a signal;
    a charge control circuit to which an output power from the voltage conversion circuit and the response signal are input; and
    a power storage device whose charging is controlled by the charge control circuit,
    wherein the charge control circuit makes a first change in a charging rate for the power storage device in accordance with the response signal, wherein the first change in the charging rate for the power storage device makes a second change in a resistance value of the power storage device, wherein the second change in the resistance value of the power storage device makes a third change in an impedance, wherein the third change in the impedance generates a modulation signal, and wherein the modulation signal generated by the third change in the impedance is transmitted from the power receiving device.

16. The power receiving device according to claim 15, wherein the charge control circuit comprises:

a switch;

a first resistor having a resistance value R1;

a second resistor having a resistance value R2; and a current mirror circuit comprising a first transistor and a second transistor, wherein the resistance value R1 is different from the resistance value R2, wherein one terminal of the switch is electrically connected to one terminal of the first resistor, wherein one terminal of the second resistor is at a floating potential, wherein the other terminal of the switch electrically connected to one of a source and a drain of the first transistor, wherein the other terminal of the first resistor is grounded, wherein the other terminal of the second resistor is grounded, and wherein a gate of the first transistor is electrically connected to one of the source and the drain of the first transistor, a gate of the second transistor, and the one terminal of the switch.

17. The power receiving device according to claim 15, wherein the rectifier circuit comprises a bridge rectifier including four diodes.

18. The power receiving device according to claim 15, wherein the smoothing circuit comprises a capacitor, and wherein the voltage conversion circuit comprises a DC-DC converter.

* * * * *